Figure 1:
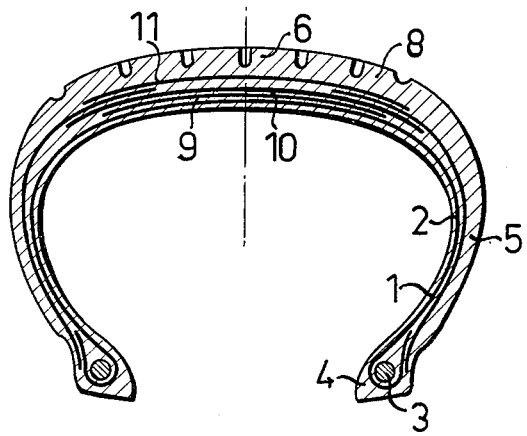

United States Patent

[11] 3,580,318

| [72] | Inventors | Hans Menell<br>Ahlem;<br>Walter Scheithauer, Meyenfeld, Germany |
|---|---|---|
| [21] | Appl. No. | 780,424 |
| [22] | Filed | Dec. 2, 1968 |
| [45] | Patented | May 25, 1971 |
| [73] | Assignee | Continental Gummi-Werke<br>Aktiengesellschaft<br>Hannover, Germany |
| [32] | Priority | Nov. 30, 1967 |
| [33] | | Germany |
| [31] | | P 16 05 639.6 |

[54] PNEUMATIC VEHICLE TIRE
8 Claims, 2 Drawing Figs.

[52] U.S. Cl. .................................................. 152/354,
152/356, 152/361
[51] Int. Cl. ..................................................... B60c 9/02,
B60c 9/18
[50] Field of Search .......................................... 152/354,
356, 361

[56] References Cited
UNITED STATES PATENTS

| 3,074,455 | 1/1963 | Richey ......................... | 152/356 |
| 3,175,598 | 3/1965 | Cegnar ......................... | 152/361 |
| 3,275,056 | 9/1966 | Menell ......................... | 152/356 |
| 3,339,610 | 9/1967 | Fausti et al. ................. | 152/354 |
| 3,414,447 | 12/1968 | Travers ......................... | 152/361 |

*Primary Examiner*—Drayton E. Hoffman
*Attorney*—Walter Becker

ABSTRACT: A pneumatic vehicle tire with at least one zenith layer, the parallel strength members of which are at least approximately parallel to adjacent strength member sections of the carcass and cross-additional parallel strength members in the tire sidewalls leading from the bead cores to the tire shoulders and also crossing with sections of carcass strength members adjacent to said tire shoulders. Those strength members of the zenith layers which extend substantially parallel to adjacent thread sections of the carcass form at least approximately right angles with the marginal areas of additional strength sections in the tire sidewalls.

PATENTED MAY 25 1971 3,580,318

INVENTOR
HANS MENELL
WALTER SCHEITHAUER
BY
*Walter Becker*

PNEUMATIC VEHICLE TIRE

The present invention relates to a pneumatic vehicle tire with a carcass and with strength members, for instance a form of threads or wires extending from bead to bead, said strength members in the tread strip zone forming an acute angle with the circumferential direction of the tire while said strength members in the tire sidewalls form a substantially right angle with the circumferential direction of the tire. More specifically, the present invention concerns a pneumatic vehicle tire of the above-mentioned type in which the strength members of the carcass are in the tread strip zone all extending in one and the same inclined direction while additionally thereto zenith layers of cord fabric are provided strength members of which likewise form an acute angle wit the circumferential direction of the tire but cross the strength members of the carcass.

It is an object of the present invention so to improve tires of the above-mentioned type that a gradual force transmission will be assured between the zenith layers on one hand and the carcass on the other hand in such a way that the force transmission between the zenith layers and the carcass gradually decreases toward the marginal area of the zenith layers.

This object and other objects and advantages of the present invention will appear more clearly from the following specification, in connection with the accompanying drawing, in which:

FIG. 1 diagrammatically illustrates a radial section through a pneumatic vehicle tire.

Figure 2:
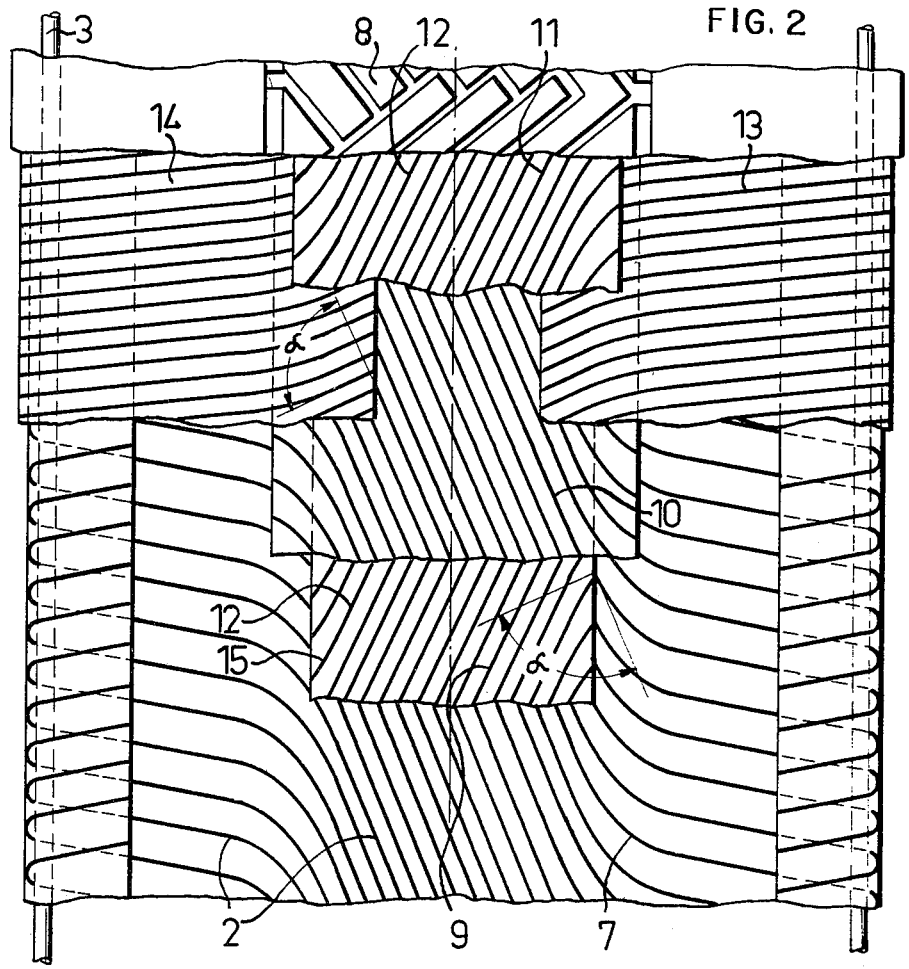

FIG. 2 is a top view of a portion of the tire according to FIG. 1, the tire body with the reinforcing inserts embedded therein being shown as located in the drawing plane for reasons of better explanation.

The pneumatic vehicle tire according to the present invention is characterized primarily in that the strength members in the form of threads or wires of the zenith layer form at the marginal areas of this layer substantially right angles with the adjacent sections of the strength members of the carcass.

To this end, the strength member sections of the carcass are in the transition area from the tread strip zone to the tire sidewalls, and preferably also the strength members of the zenith layers in the area of said marginal regions of said layers are bent toward the tire sidewalls. In this way, the above-mentioned angular location will be assured even though the strength members of the carcass as well as of the zenith layers form an acute angle in the tread strip zone, and the strength members of the carcass in the tire sidewalls described a substantially right angle with the circumferential direction of the tire.

The present invention is applicable to tires of the above-mentioned type in which the tread strip zone has additional zenith layers arranged therein the strength members of which extend in the direction of the respective adjacent carcass strength members to thereby secure a further reinforcement in the tread strip zone. Moreover, in the tire sidewalls additional parallel threads or wires or other strength members may be provided which extend from the bead cores to the tire shoulders and across the respective adjacent strength member sections of the carcass. Also, for these additional strength members extending up to the tire shoulders, a strengthwise favorable power transmission is provided inasmuch as also the ends of said strength members extend at a substantially right angle to the strength members of the zenith layer therebelow.

Referring now to the drawing in detail, the tire body of rubber material comprises carcass layer 1, the parallel pull resistance strength members 2 of which extend from bead to bead and are looped around the bead cores 3 in the tire beds 4 so as to be anchored thereto. The strength members 2 ascend within the region of the tire sidewalls 5 at an angle of some 10° to 15° with regard to the transverse direction of the tire and when considering both tire sidewalls extend in the same inclined direction. In the transition area between the tire sidewall 5 of the tread strip zone 6, the strength members 2 are curved. The curved strength member sections are designated with the reference numeral 7. These last-mentioned strength member sections merge with straight strength sections, and the here-located strength members 2 describe angles of from 5° to 30° with the circumferential direction of the tire preferably angles of approximately 20°. The width section of the carcass in which the strength members 2 extend rectilinearly in the tread strip zone 6 has a width which approximately equals the width of the tread strip 8.

Above the carcass 1 there are arranged three zenith layers 9, 10 and 11. The strength members, for instance threads 12, of these zenith layers are arranged in such a way as to ascend alternately in the left-hand and the right-hand direction while the said strength members 12 of the zenith layer 9 cross the strength members 2, as for instance threads, of the carcass 1. All strength members 12 and the adjacent sections of the strength members 2 define with the circumferential direction of the tire angles of from 5° to 30° preferably angles of approximately 20°.

Since the strength members 2 in the tire sidewalls 5 are arranged at an acute angle with regard to the transverse direction of the tire, additional oppositely ascending pull-resistant threads, strength members or threads 13 parallel to each other are provided. The layers 14 formed by said strength members 13 extend over the tire height of the tire sidewalls 5, and the marginal areas thereof are located between the zenith layers 10 and 11 while overlapping the tire shoulders. Also the strength members 13, similar to those sections of the strength member 2 in the tire sidewalls 5 which face said strength members 13, describe angles of from 5° to 15° with the transverse direction of the tire.

With regard to the above-described pneumatic tires according to the invention, it is of particular importance that for obtaining a favorable stress within the region of the tire shoulders or within the transition area from the zenith layers on one hand and the layers further inwardly in the strip sidewalls 5, that the placing of the strength members such as threads and wires is effected in a special way in order thus gradually to reduce the transmission of forces through the zenith layers 9, 10 and 11 to the marginal areas thereof.

These steps relate to such strength members such as threads or wires which in their normal course are embedded in the tire body so that they ascend in opposite direction. In other words, the said steps relate to the strength members 2 of the carcass 1 on one hand and the oppositely ascending strength members 12 of the zenith layers 9, and furthermore to the strength members 14 of the layers 13 and the zenith layer 10 therebelow.

In order to realize the above-mentioned effect, the strength members 12 of the zenith layer 9 form at the marginal areas of this layer an angle $\alpha$ of from 80° to 90° with the curved strength member sections 7 therebelow. This is realized not only by a corresponding curvature of the strength member or thread sections 7, but also to the fact that the strength members 12, as indicated at 15, are bent off toward the transverse direction of the tire.

The strength members 12 of the layer 10, however, show a course which corresponds to that of the strength members 2 of carcass 1 in the adjacent sections. In the intermediate portion of the zenith layer 10, the threads 12 thus extend linearly, and within the region of the curvature 7 correspond in their course to that of said curvature. The threads or strength members 14 of layers 13 which are arranged immediately above the strength layers 12, and extend through the tire sidewalls 5 and while increasing the inclined angles of said strength members are bent off in such a way that also in this instance, a crossed angle $\alpha$ of approximately 80° to 90° is formed.

In addition to the above, the course of the strength members 12 of layer 11 correspond substantially to the course of the threads 12 of layer 9. Also, in this instance, the marginal areas of layer 11 are provided with curved thread sections in order to be able in this way to adapt the course of the threads or strength members to that of the threads or strength members 14 arranged therebelow and pertaining to the layers 13.

The tire according to the present invention is preferably designed with the layers crossed in the manner shown in the drawing, while a double cross connection is formed in the tread strip zone and a single cross connection is formed in each tire sidewall 5.

It is, of course, to be understood that the present invention is by no means limited to the particular construction shown in the drawing, but comprises modifications within the scope of the appended claims.

What we claim is:

1. A pneumatic vehicle tire having a strength member reinforced carcass and a tread strip and sidewalls and comprising strength members extending from bead to bead while in the region of said tread strip forming an acute angle with the circumferential direction of the tire and in said sidewalls forming substantially right angles with the circumferential direction of the tire, the strength members of said carcass within the area of said tread strip extending in the same inclined direction, said vehicle tire including at least one zenith layer with strength members, said last-mentioned strength members at the marginal areas of the zenith layer pertaining thereto forming at least approximately right angles specifically at end points crossed with the respective adjacent strength member sections of said carcass.

2. A pneumatic vehicle tire according to claim 1, in which the strength members of each zenith layer respectively are all bent off toward the respective adjacent tire sidewall.

3. A pneumatic vehicle tire according to claim 2, in which the strength members of said carcass are curved in the shoulder areas of said tire and in said shoulder areas are adjacent to the bent off portions of the strength members pertaining to the respective adjacent zenith layer forming between 80°—90° angle.

4. A pneumatic vehicle tire with bead cores, which includes: a carcass having strength members embedded therein, at least one zenith layer having substantially parallel pull-resistant strength members at least approximately parallel to adjacent sections of the carcass strength members, additional strength members extending from said bead cores through the sidewalls up to the shoulders of the tire and crossing adjacent sections of the carcass strength members, said strength members of said zenith layers forming at least approximately right angles specifically at end points crossed with said additional strength members at the marginal areas of said zenith layers.

5. A pneumatic tire according to claim 4, in which the strength members of said zenith layers and the strength members in said tire sidewalls are within the area of the tire shoulders all bent off so as to increase the angle of their inclined course.

6. A pneumatic vehicle tire according to claim 5, in which the strength members of said zenith layer correspond as to their course to the course of the adjacent strength member sections of said carcass in a slim *s*.

7. A pneumatic vehicle tire according to claim 4, in which said additional strength members are located outside and peripherally marginal areas of one zenith layer but below marginal areas of another zenith layer, the direction in which the strength members of said last-mentioned zenith layer extend corresponding to the direction of the strength members in said tire sidewalls.

8. A pneumatic tire according to claim 7, in which the strength members of said other zenith layer are also within the area of said tire shoulders and are all at ends bent off toward said strength members in said sidewalls.